United States Patent

Couasnon et al.

[11] Patent Number: 5,855,413
[45] Date of Patent: Jan. 5, 1999

[54] SLIDEWAY FOR A VEHICLE SEAT, AND A SEAT INCLUDING SUCH A SLIDEWAY

[75] Inventors: Christian Couasnon, Saint Denis de Gastines; François Cortal, Roncq, both of France

[73] Assignee: Bertrand Faure Equipments SA, Boulogne, France

[21] Appl. No.: 982,674

[22] Filed: Dec. 2, 1997

[30] Foreign Application Priority Data

Dec. 3, 1996 [FR] France ................................. 96 14800

[51] Int. Cl.⁶ ............................................. B60N 2/00
[52] U.S. Cl. ..................................... 297/341; 297/378.1
[58] Field of Search .......................... 248/429; 297/341, 297/378.12, 344.1, 378.1, 378.14

[56] References Cited

U.S. PATENT DOCUMENTS

| | | | |
|---|---|---|---|
| 4,159,147 | 6/1979 | Kiyomitsu et al. | 297/341 |
| 4,909,570 | 3/1990 | Matsuhashi . | |
| 5,273,241 | 12/1993 | Droulon | 248/429 |
| 5,641,145 | 6/1997 | Droulon et al. . | |
| 5,688,026 | 11/1997 | Reubeuze et al. . | |
| 5,717,300 | 2/1998 | Baloche et al. . | |
| 5,785,291 | 7/1998 | Chang . | |

FOREIGN PATENT DOCUMENTS

| | | |
|---|---|---|
| 485332 | 6/1975 | Australia . |
| 2 378 649 | 8/1978 | France . |
| 2 682 332 | 4/1993 | France . |
| 205524 | 9/1986 | Japan . |
| 2 234 431 | 2/1991 | United Kingdom . |
| 2 303 299 | 2/1997 | United Kingdom . |
| WO 97/03860 | 2/1997 | WIPO . |

OTHER PUBLICATIONS

French Search Report dated 12 Aug. 1997, French Application FR 9614800 filed 3 Dec. 1996.

Primary Examiner—Milton Nelson, Jr.
Attorney, Agent, or Firm—Marshall, O'Toole, Gerstein, Murray & Borun

[57] ABSTRACT

A motor vehicle seat slideway has an unlocking lever pivotally mounted on the moving rail of the slideway and urged towards a rest position, a cable connecting said lever to the seat back to unlock the slideway when the seat back is tilted down forwards, and a trigger pivotally mounted on the moving rail to pivot between a blocking position in which it holds the lever in its actuated position and a retracted position enabling the lever to return to its rest position. The trigger is urged resiliently towards its blocking position, and it also includes an actuator finger which, on coming into contact with an abutment secured to the stationary rail of the slideway, moves the trigger towards its retracted position.

8 Claims, 3 Drawing Sheets

5,855,413

SLIDEWAY FOR A VEHICLE SEAT, AND A SEAT INCLUDING SUCH A SLIDEWAY

FIELD OF THE INVENTION

The present invention relates to slideways for vehicle seats, and to seats including such slideways.

Amongst the slideways in question, the invention relates more specifically to those designed to support the seat proper of a seat, and particularly of a front seat in a vehicle that has two doors, which seat is slid forwards in order to give access to the back seats of the vehicle.

Such slideways must be capable not only of being adjusted in longitudinal position at the convenience of a user, but must also be capable of being unlocked to allow the seat to be slid forwards quickly, after which said slideways must also re-lock automatically when the seat is slid backwards.

BACKGROUND OF THE INVENTION

Document FR-A-2 682 332 describes such a slideway for a vehicle seat which includes a seat back mounted on the seat proper, which back is suitable for tilting down forwards, that slideway comprising:

- a "stationary" first rail designed to be secured to the vehicle;
- a "moving" second rail designed to support the seat proper, said moving rail being disposed parallel to the stationary rail and being mounted to slide along said stationary rail in a "longitudinal" direction;
- a latch mounted on the moving rail, said latch being movable between firstly a locked position in which it co-operates with the stationary rail to prevent the two rails moving relative to each other, and secondly an unlocked position in which it co-operates with the stationary rail and enables the moving rail to slide relative to the stationary rail;
- a latch spring urging the latch towards its locked position;
- means for manually displacing the latch from its locked position to its unlocked position;
- an unlocking lever pivotally mounted on the moving rail to move between two angular positions, firstly an active position in which said unlocking lever acts on the latch holding it in its unlocked position, and secondly a rest position in which said unlocking lever does not act on the latch;
- means for moving the unlocking lever from its rest position to its active position, said means being designed to be actuated by the seat back being tilted down forwards;
- a lever spring for urging the unlocking lever towards its rest position; and
- at least one first abutment member secured in permanent manner to the stationary rail and causing the unlocking lever to return to its rest position when the moving rail is in a predetermined position relative to the stationary rail and when the means for moving the lever are not actuated. The slideway unlocking lever disclosed in that document has a neutral angular position between its active position and its rest position, such that the lever is urged by the lever spring either towards its active position when it lies in an angular position between its neutral and active positions, or else towards its rest position when it is in an angular position between its neutral and rest positions. Thus, when the seat is moved backwards with the unlocking lever in the active position, after the seat has been moved as far forwards as possible, the unlocking lever comes into contact with the first abutment member, thereby causing said lever to pivot progressively from its active position to just beyond its neutral position, while the moving rail continues to move backwards a little.

When the unlocking lever has gone past its neutral position, it is driven immediately into its rest position by the lever spring, such that the latch can then return to its locked position, thus preventing the seat proper from moving.

The slideway described in the above-mentioned document gives complete satisfaction.

Nevertheless, it requires design decisions that can be awkward and difficult to make:

- for the stroke of the latch between its locked position and its unlocked position;
- for the shape of the unlocking lever; and
- more generally, for the position given to the latch so long as the unlocking lever is between its active position and its neutral position.

In that known slideway, those parameters must necessarily be selected so that the latch does not co-operate with the stationary rail of the slideway so long as the unlocking lever is situated in an angular position lying between its active position and its neutral position, otherwise the slideway will jam without locking completely.

OBJECT AND SUMMARY OF THE INVENTION

A particular object of the present invention is to mitigate that drawback.

To this end, according to the invention, a slideway of the kind in question further includes a trigger pivotally mounted relative to the moving rail, said trigger being movable between firstly a blocking angular position where it co-operates with the unlocking lever when said lever is in its active position to prevent said unlocking lever from returning to its rest position, and secondly a retracted position where said trigger does not prevent the unlocking lever from returning towards its rest position, the trigger being urged resiliently towards its blocking position, and said trigger further including an actuator finger which comes into contact with said first abutment member when the moving rail is in said predetermined position relative to the stationary rail to cause the trigger then to be moved into its retracted position by a camming effect, the lever spring being a traction spring which is mounted between a first attachment point secured to the unlocking lever and a second attachment point secured to the trigger, said attachment points being disposed so that the first attachment point moves away from the second attachment point when the unlocking lever goes from its rest position to its active position, and so that the second attachment point moves away from the first attachment point when the trigger goes from its blocking position to its retracted position, the lever spring thus urging the trigger towards its blocking position while simultaneously urging the unlocking lever towards its rest position.

By means of these dispositions, the unlocking lever always remains in its active position so long as the seat is being moved backwards after it has been moved fully forwards, and the unlocking lever then passes instantly from its active position to its rest position when the seat returns to its predetermined re-locking position.

Thus, while the slideway is being re-locked, the intermediate stage during which the prior art unlocking lever moves progressively from its active position to its neutral position while the moving rail continues to move backwards is eliminated.

Consequently, the design of the slideway of the invention is no longer subject to the above-mentioned technical constraints.

In preferred embodiments of the slideway of the invention, use may optionally be made of one or more of the following dispositions:

- the unlocking lever and the trigger are pivotally mounted about two respective horizontal axes perpendicular to the longitudinal direction, the trigger comprising a vertical rigid plate having a top edge extending away from the pivot axis of said trigger to a substantially vertical stop edge, the unlocking lever having a bearing member which, when said unlocking lever goes from its rest position to its active position, presses on the top edge of said plate, moving the trigger from its blocking position towards its retracted position, and then goes past the stop edge of the plate, thus enabling the trigger to return towards its blocking position, said stop edge then co-operating with the bearing member to prevent the unlocking lever from returning towards its rest position;
- the stationary rail has a web designed to face downwards, the first abutment member being fixed to the underside of said web; and
- the moving rail is longitudinally displaceable relative to the stationary rail between a front abutment position and a back abutment position, the slideway including, in addition to the first abutment member, a second abutment member which is disposed to come into contact with the actuator finger of the trigger when the moving rail is in its back abutment position, then moving said trigger towards its retracted position by a camming effect.

The invention also provides a vehicle seat including a seat proper that supports a back which can be tilted down forwards and that is mounted to slide longitudinally by means of at least one first slideway as defined above, the seat being fixed to the moving rail of the slideway.

In preferred embodiments of the seat of the invention, use may optionally be made of one or more of the following dispositions:

- the means for moving the unlocking lever from its rest position to its active position comprise a cable connecting the unlocking lever to the seat back, said cable being mounted to be subjected to traction when the seat back is tilted down forwards, then holding the lever in its active position so long as the seat back is tilted down;
- a second slideway extends parallel to the first slideway and has a stationary rail substantially identical to the stationary rail of the first slideway, a moving rail substantially identical to the moving rail of the second slideway, and a latch substantially identical to the latch of the first slideway, the latches of the first and second slideways being mounted to pivot vertically on their respective moving rails between their locked and unlocked positions, each of the latches being disposed on one side of the corresponding slideway in an intermediate space situated between the two slideways, and the two latches being connected to each other by a transverse rigid link bar which is itself secured to an actuator handle and which constrains both latches to occupy identical angular positions; and
- the link bar is substantially rectilinear.

BRIEF DESCRIPTION OF THE DRAWINGS

Other characteristics and advantages of the invention appear from the following detailed description of an embodiment thereof, given by way of non-limiting example, and with reference to the accompanying drawings.

In the drawings:

FIG. 3 is an exploded perspective view of the unlocking mechanism fitted to one of the slideways of FIG. 2, said mechanism being seen looking along arrow III of FIG. 2;

MORE DETAILED DESCRIPTION

Figure 1:
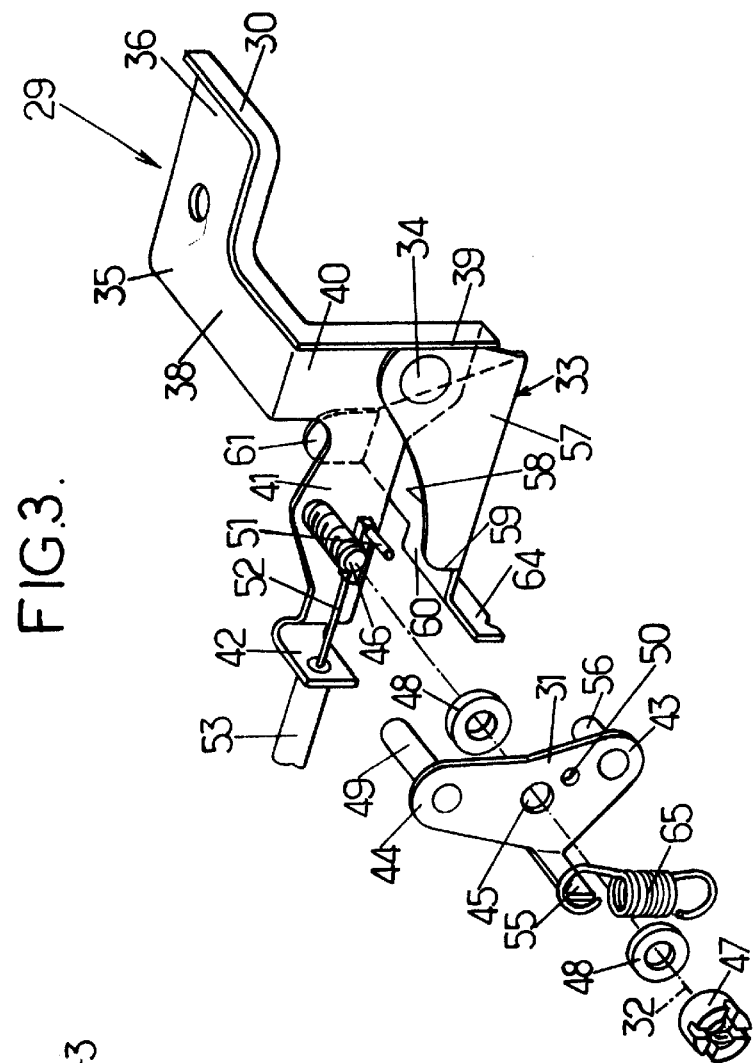
FIG. 1 is a diagrammatic view of a seat embodying the invention.

As shown diagrammatically in FIG. 1, the invention applies to a vehicle seat 1, in particular a front seat for a two-door motor vehicle where it is necessary to move at least one of the front seats in order to gain access to the back seat.

The seat 1 comprises a seat proper 2 and a seat back 3 pivotally mounted on the seat proper about a horizontal transverse axis 4.

The seat proper 2 is mounted on the floor 5 of the vehicle via two parallel juxtaposed slideways 6 so as to enable the seat to move forwards or backwards in a longitudinal direction L.

Each of the slideways 6 comprises firstly a stationary metal rail 7 substantially in the form of an upwardly-open channel section member which is secured to the floor 5 of the vehicle, and secondly a moving metal rail 8 substantially in the form of a downwardly open channel section member which carries the seat proper 2 of the seat, the moving rail being capable of sliding along the stationary rail between a front abutment position and a back abutment position.

Figure 2:
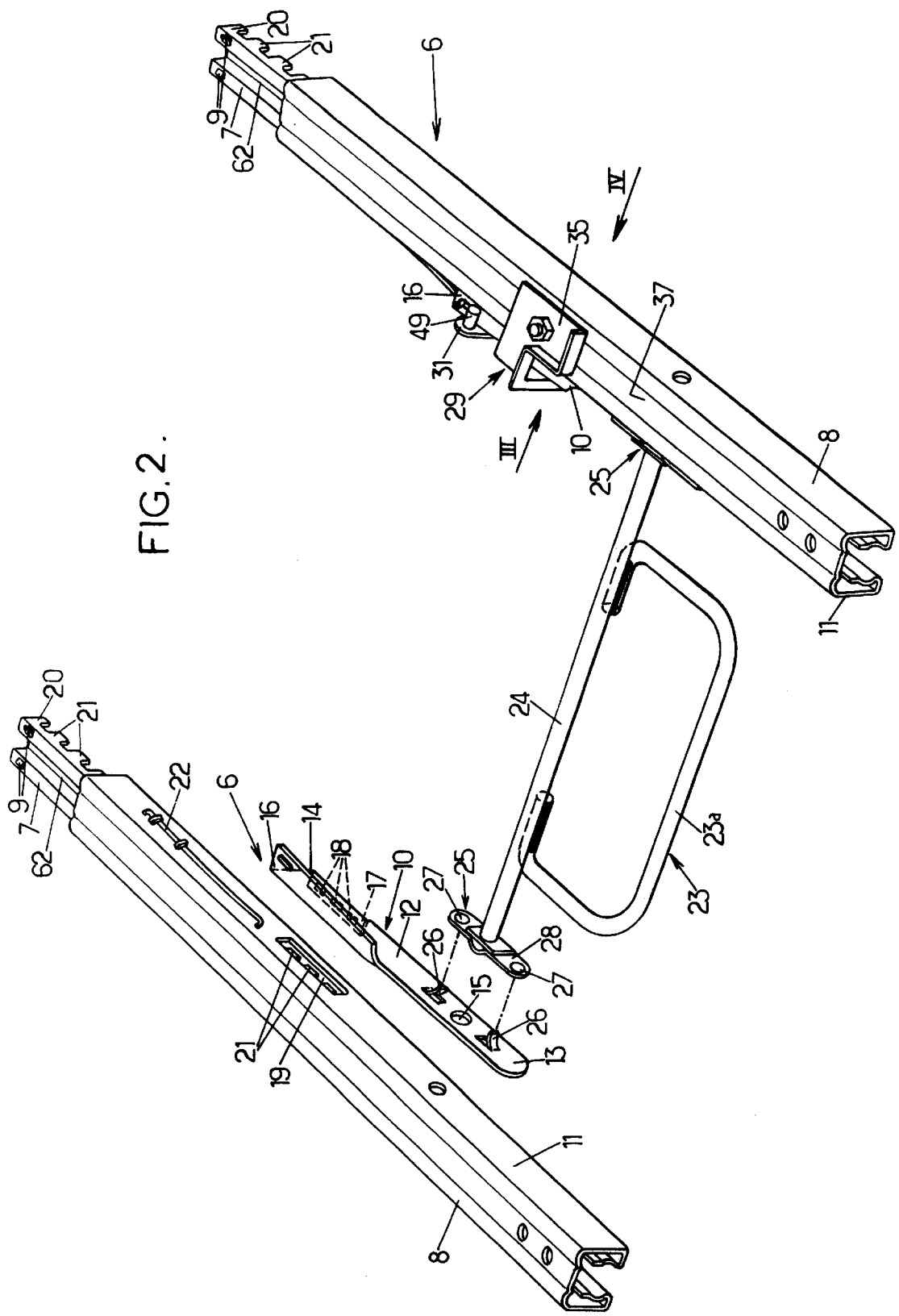
FIG. 2 is an exploded perspective view of the slideways for adjusting the longitudinal position of the FIG. 1 seat.

As shown in greater detail in FIG. 2, the back abutment position of each moving rail 8 can be defined, in particular, by abutments 9 formed by punched protrusions formed at the back end of the stationary rail 7 and co-operating with corresponding portions (not shown) that move with the moving rail 8.

Similarly, the front abutment position of each moving rail 8 can be defined by abutments similar to the abutments 9, this time formed at the front end of the corresponding stationary rail 7 and co-operating with corresponding portions (not shown) that move with the moving rail.

Also, each of the two slideways 6 further includes a latch 10 made of cut and folded sheet metal which is mounted on the side of one of the vertical flanges 11 of the moving rail 8, in the intermediate space lying between the two slideways 6.

Where appropriate, it can be possible to provide a latch 10 on only one of the two slideways 6, without going beyond the ambit of the invention.

The latch 10 has a vertical web 12 which extends between a front end 13 and a back end 14 and which lies against the corresponding vertical flange 11 of the moving rail 8. The web 12 is pivotally mounted on said flange 11 about a transverse horizontal axis 15 situated in the vicinity of its front end 13.

Also, in the vicinity of its back end 14, the web 12 of the latch is extended firstly by a substantially horizontal top flap 16 pointing into the intermediate space between the two slideways 6, and secondly by a substantially horizontal bottom flap 17 which is pierced by a plurality of holes 18 and which penetrates with a certain amount of vertical clearance into the moving rail 8 via a window 19 formed in the vertical flange 11 thereof.

The bottom flap 17 is thus beneath a vertical side flap 20 belonging to the stationary rail 7, which vertical flap has downwardly-directed teeth 21 on its bottom edge disposed to correspond with the holes 18 in the bottom flap of the latch.

Also, the back end 14 of the latch is urged upwards by a spring wire 22 fixed to the vertical flange 11 of the moving rail 8, so as to place the latch 10 in a latched position where the teeth 21 of the stationary rail are blocking in the holes 18 of the bottom flap of the latch, thereby preventing the slideway 6 from moving.

Naturally, the holes 18 of the bottom flap 17 of the latch could be replaced by a set of teeth extending horizontally, and more generally the latch could co-operate with the stationary rail of the slideway in any other known manner suitable for preventing the slideway from moving.

Finally, the front ends 13 of the two latches are secured to a cross-bar 23 which is common to both slideways and which enables both latches 10 of the seat to be pivoted simultaneously so as to move the back ends 14 of the latches downwards to an unlocked position in which the bottom flaps 17 of both latches are disengaged from the teeth 21 of both stationary rails.

Preferably, in order to guarantee that both latches have exactly the same angular orientation, it is advantageous for the cross-bar 23 to be constituted by:

- a rigid metal link rod 24 which is advantageously tubular and preferably substantially rectilinear, which bar extends horizontally in a transverse direction between two ends 25 which are secured substantially without play to the respective webs 12 of the two latches, the link bar 24 lying, for example, on the common pivot axis 15 of the two latches; and
- a handle 23a e.g. in the form of a substantially U-shaped rigid metal tube whose two ends are welded to the bar 24, the base of the U-shape being disposed in the vicinity of the front end of the seat proper so as to be easily accessible to a user, thereby enabling the user to adjust the longitudinal position of the seat at will.

These dispositions serve to synchronize the two latches 10 effectively while using a small number of parts and while occupying little space.

The ends 25 of the link bar can be secured to the latches 10 by any known means, e.g. welding, screws, etc. However, this is preferably done by crimping two tabs 26 cut in the web 12 of each latch, with the two tabs penetrating into respective orifices 27 formed in a fixing plate 28 that is itself fixed to the corresponding end 25 of the link bar by screws or by welding.

The moving rail 8 of one of the two slideways also carries an unlocking mechanism 29 which is visible in FIGS. 2 to 5.

This unlocking mechanism comprises:
- a support 30 in the form of a piece of cut and folded sheet metal which is fixed to the moving rail 8;
- an unlocking lever 31 likewise in the form of a piece of cut and folded sheet metal and which is pivotally mounted on the support 30 about a transverse horizontal axis 32; and
- a trigger 33, itself made in the form of a piece of cut and folded sheet metal, and pivotally mounted on the support 30 about a transverse horizontal axis 34.

As can be seen in detail in FIG. 3, the support 30 comprises:
- a top horizontal wall 35 that is L-shaped, having a first limb 36 which extends longitudinally and which is fixed above the horizontal web 37 of the moving rail, and secondly a second limb 38 which extends in the transverse direction projecting beyond the moving rail into the intermediate space situated between the two slideways, and passing over the top flap 16 of the corresponding latch (see FIG. 1); and
- a vertical flap 39 which is likewise substantially L-shaped, having a first limb 40 extending downwards from the end of the second limb of the horizontal wall 35, and secondly a second limb 41 which extends backwards to an end 42 which is folded transversely into the intermediate space situated between the two slideways.

The unlocking lever 31 is also generally in the form of an elongate vertical plate extending between a bottom end 43 and a top end 44, the plate being pierced by an orifice 45 between its two ends.

A horizontal threaded pivot pin 46 passes through the orifice 45 defining the pivot axis 32 and is secured to the second branch 41 of the flap 39 belonging to the support 30, the lever 31 being pivotally mounted on said pivot by means of a nut 47 and washers 48.

The top end 44 of the lever 31 is secured to a rigid metal rod 49 which extends horizontally transversely towards the moving rail 8 to which the unlocking mechanism is fixed, immediately above the top flap 16 of the corresponding latch.

In addition, the lever 31 also has a hole 50 situated beneath its orifice 45, the hole 50 receiving a hook 51 which is fixed to the end of a steel cable 52 sliding in a sheath 53.

One end of this sheath is fixed to the end 42 of the support 30, while the other end of said sheath is fixed to the strength member of the seat proper, the corresponding end of the cable 52 itself being fixed to the strength member of the seat back, as shown diagrammatically in FIG. 1, at a fixing point 54 which is preferably fixed beneath the pivot axis 4, or behind said axis.

In this manner, when the seat back 3 is tilted down forwards, it exerts traction on the cable 52, thereby pivoting the lever 31 to an active position in which the rod 49 presses on the top flap 16 of the latch sufficiently to cause the latch to move into its unlocked position.

Also, the lever 31 has a tongue 55 folded in a transverse horizontal direction into the intermediate space situated between the two slideways 6, and the bottom end 43 of this lever is secured to a rigid metal rod 56 which co-operates with the trigger 33.

The trigger 33 has a vertical wall 57 which is pivotally mounted on the first limb 40 of the L-shaped flap 39 belonging to the support 30. This vertical wall has a sloping top edge extending downwards and backwards from the pivot axis 34, said top edge terminating at a back end which is defined by a substantially vertical stop edge 59.

The bottom edge of the vertical wall 57 is extended horizontally to beneath the stationary rail 7 of the slideway by a horizontal flap 60 which extends to an upwardly folded end forming a vertical finger 61 situated beneath the web 62 of the stationary rail.

The space required for the flap 60 and the finger 61 to pass and slide freely in the longitudinal direction beneath the stationary rail is obtained by any known means, e.g. by means of raised support tabs 63 which connect the stationary rail to the floor 5 of the vehicle (see FIG. 1) and/or by the floor 5 being locally depressed in shape.

Also, the rear edge of the horizontal flap 60 is folded downwards, forming a rigid tongue 64 which extends horizontally in the transverse direction towards the intermediate space situated between the two slideways 6 and situated beneath the tongue 55 of the lever 31.

A traction spring 65 is mounted between the tongues 55 and 64, thereby having the following effects:

urging the lever 31 towards a rest position in which the rod 49 of said lever does not touch the flap 26 of the latch, and in which the rod 56 is in contact with the top edge 58 of the trigger 33; and a urging the trigger 33 upwards, i.e. towards a "blocking" position in which the finger 61 of said trigger is at a small distance beneath the web 62 of the stationary rail 7.

Figure 4:
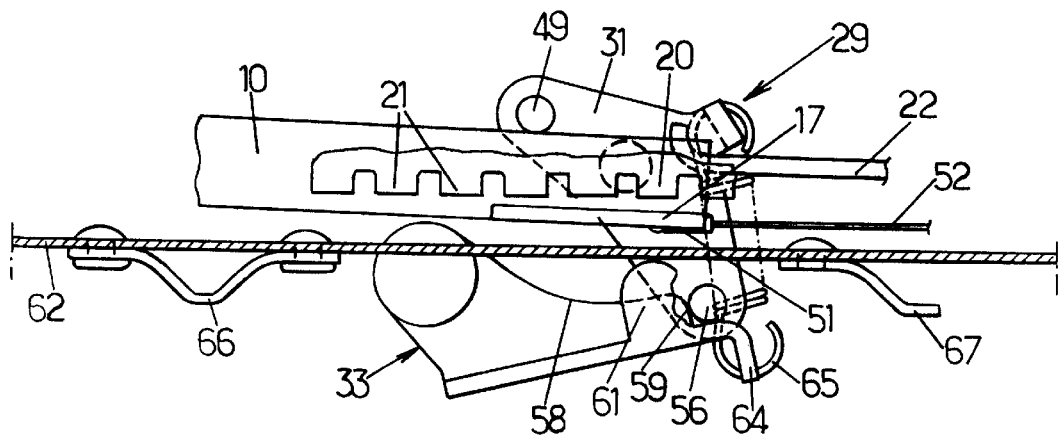
FIG. 4 is a diagrammatic view of the FIG. 3 mechanism in the unlocking position, said mechanism being seen looking along arrow IV in FIG. 2.
Figure 5:
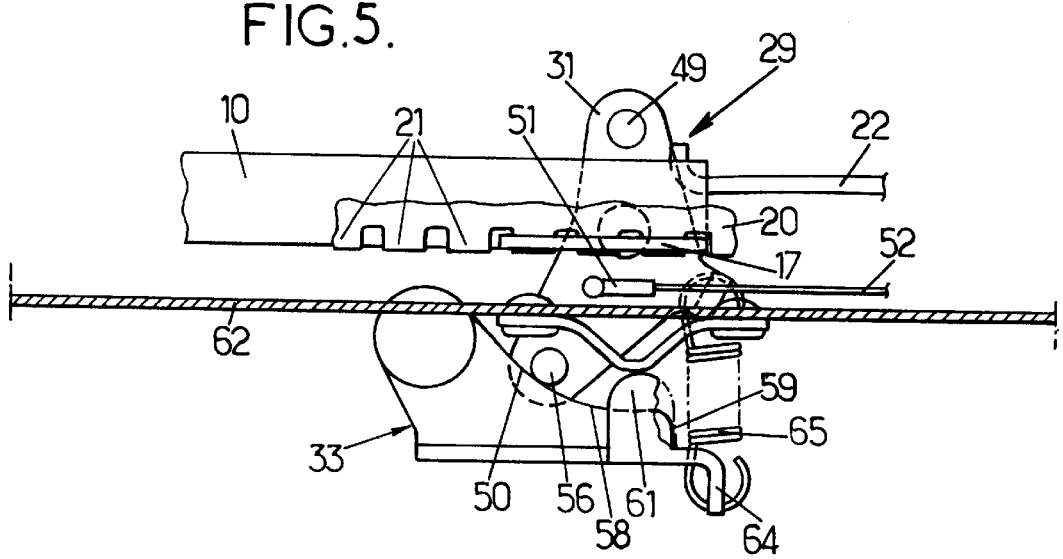
FIG. 5 is a view similar to FIG. 4, showing the unlocking mechanism in the rest position.

Finally, as shown in FIGS. 4 and 5, two rigid abutments 66 and 67 are disposed beneath the web 62 of the stationary rail 7, each of which abutments is implemented in the form of a tongue of folded sheet metal and is fixed to the underside of the web 62 by any known means, in particular by crimping.

The first abutment 66 is substantially in the form of a rounded V-shape, with two sloping branches that form a ramp fixed beneath the web 62 of the stationary rail 7.

This first abutment 66 is placed to come into contact with the finger 61 of the trigger when the moving rail 8 is in a middle position, intermediate between its front abutment position and its back abutment position.

The second abutment 67 could have the same shape as the first abutment 66, but it is preferably in the form of a single ramp sloping downwards and backwards from an end that is fixed to the underside of the web 62 of the stationary rail 7. This second abutment 67 is disposed to come into contact with the finger 61 of the trigger when the moving rail 8 is in its back abutment position.

The above-described device operates as follows.

When a user seeks to gain access to the back seat of the vehicle or to leave the back of the vehicle, the back 3 of the seat is unlocked, e.g. by acting on a knob 68 (FIG. 1) in conventional manner, thus allowing the back 3 to be tilted down forwards.

This first movement has the effect of pulling on the cable 52 which pivots the unlocking lever from its rest position to its active position.

During this movement, the rod 56 of the lever 31 presses on the top edge 58 of the trigger 33 and causes the trigger to pivot downwards by a camming effect, until the rod 56 has gone past the back end of the top edge 58, after which the trigger 33 is returned upwards by the spring 65.

The lever 31 is then held in its active position by the rod 56 abutting against the stop edge 59 of the trigger (FIG. 4).

In this position, the rod 49 of the lever 31 presses on the top flap 16 of the latch 10 belonging to the same slideway 6 as the unlocking mechanism 29, thereby placing this latch in its unlocked position.

The movement of this latch 10 is transmitted to the latch of the other slideway 6 by the link bar 24, such that the two slideways 6 are then unlocked and can slide freely, thus enabling the user to move the seat proper 2 fully forwards.

During this movement, and depending on the initial adjustment of the slideways 6, the finger 61 of the trigger may encounter the first abutment 66: in which case, the finger 61 is pushed downwards by a camming effect as it passes beneath the abutment 66 so that the trigger 33 passes temporarily into a retracted position in which it no longer retains the lever 31. Nevertheless, this movement of the trigger does not cause the lever 31 to move since the lever continues to be held in its active position by the traction of the cable 52.

Thereafter, when it is desired to return the seat to its position for use, the first action is to raise the seat back 3 so that the cable 52 no longer exerts any traction force on the lever 31.

The lever 31 is then held in its active position solely by co-operation between the rod 56 and the stop edge 59.

Finally, the user moves the seat proper 2 backwards: when the finger 61 of the trigger encounters the first abutment 66, the trigger is displaced by the camming effect into its retracted position, where the top edge 58 of the trigger is beneath the rod 56 of the lever 31.

The lever 31 can thus return to its rest position under drive from the spring 65 (FIG. 5), thereby enabling both latches 10 to be re-locked simultaneously.

The second abutment 67 is of use:

when the seat back 3 has been tilted down forwards without the seat proper 2 being moved forwards;

or when the seat back has been tilted down forwards too little for the finger 61 to go past the abutment 66 in the forward direction;

or else when the seat back has been folded down forwards, the seat has been moved to the front abutment, and the seat has then been moved backwards, but without raising the seat back before moving the seat backwards.

All the above circumstances correspond to abnormal use of the seat, and it is possible for the seat proper to end up in an unlocked position, with the finger 61 of the trigger situated between the two abutments 66 and 67.

However, under such circumstances, the finger 61 will generally come into contact with the abutment 67 after the seat back has been raised, or possibly into contact with the abutment 66, thereby making it possible in any event to re-lock the slideways.

We claim:

1. A slideway for a vehicle seat which includes a seat back capable of being tilted down forwards on a seat proper, said slideway comprising:

a "stationary" first rail designed to be secured to the vehicle;

a "moving" second rail designed to support the seat proper, said moving rail being disposed parallel to the stationary rail and being mounted to slide along said stationary rail in a "longitudinal" direction;

a latch mounted on the moving rail, said latch being movable between firstly a locked position in which it co-operates with the stationary rail to prevent the two rails moving relative to each other, and secondly an unlocked position in which it co-operates with the stationary rail and enables the moving rail to slide relative to the stationary rail;

a latch spring urging the latch towards its locked position;

means for manually displacing the latch from its locked position to its unlocked position;

an unlocking lever pivotally mounted on the moving rail to move between two angular positions, firstly an active position in which said unlocking lever acts on the latch holding it in its unlocked position, and secondly a rest position in which said unlocking lever does not act on the latch;

means for moving the unlocking lever from its rest position to its active position, said means being designed to be actuated by the seat back being tilted down forwards;

a lever spring for urging the unlocking lever towards its rest position; and at least one first abutment member secured in permanent manner to the stationary rail and causing the unlocking lever to return to its rest position when the moving rail is in a predetermined position relative to the stationary rail and when the means for moving the lever are not actuated;

wherein said slideway further includes a trigger pivotally mounted relative to the moving rail, said trigger being movable between firstly a blocking angular position where it co-operates with the unlocking lever when said lever is in its active position to prevent said unlocking lever from returning to its rest position, and secondly a retracted position where said trigger does not prevent the unlocking lever from returning towards its rest position, the trigger being urged resiliently towards its blocking position, and said trigger further including an actuator finger which comes into contact with said first abutment member when the moving rail is in said predetermined position relative to the stationary rail to cause the trigger then to be moved into its retracted position by a camming effect, the lever spring being a traction spring which is mounted between a first attachment point secured to the unlocking lever and a second attachment point secured to the trigger, said attachment points being disposed so that the first attachment point moves away from the second attachment point when the unlocking lever goes from its rest position to its active position, and so that the second attachment point moves away from the first attachment point when the trigger goes from its blocking position to its retracted position, the lever spring thus urging the trigger towards its blocking position while simultaneously urging the unlocking lever towards its rest position.

2. A slideway according to claim 1, in which the unlocking lever and the trigger are pivotally mounted about two respective horizontal axes perpendicular to the longitudinal direction, the trigger comprising a vertical rigid plate having a top edge extending away from the pivot axis of said trigger to a substantially vertical stop edge, the unlocking lever having a bearing member which, when said unlocking lever goes from its rest position to its active position, presses on the top edge of said plate, moving the trigger from its blocking position towards its retracted position, and then goes past the stop edge of the plate, thus enabling the trigger to return towards its blocking position, said stop edge then co-operating with the bearing member to prevent the unlocking lever from returning towards its rest position.

3. A slideway according to claim 1, in which the stationary rail has a web designed to face downwards, the first abutment member being fixed to the underside of said web.

4. A slideway according to claim 1, in which the moving rail is longitudinally displaceable relative to the stationary rail between a front abutment position and a back abutment position, the slideway including, in addition to the first abutment member, a second abutment member which is disposed to come into contact with the actuator finger of the trigger when the moving rail is in its back abutment position, then moving said trigger towards its retracted position by a camming effect.

5. A vehicle seat including a seat proper supporting a seat back that can be tilted down forwards, and which is mounted to slide longitudinally by means of at least a first slideway according to claim 1, the seat proper being fixed to the moving rail of the slideway.

6. A vehicle seat according to claim 5, in which the means for moving the unlocking lever from its rest position to its active position comprise a cable connecting the unlocking lever to the seat back, said cable being mounted to be subject to traction when the seat back is tilted down forwards, then holding the lever in its active position so long as the seat back is tilted down.

7. A vehicle seat according to claim 5, further including a second slideway which extends parallel to the first slideway and has a stationary rail substantially identical to the stationary rail of the first slideway, a moving rail substantially identical to the moving rail of the first slideway, and a latch substantially identical to the latch of the first slideway, the latches of the first and second slideways being mounted to pivot vertically on their respective moving rails between their locked and unlocked positions, each of the latches being disposed on one side of the corresponding slideway in an intermediate space situated between the two slideways, and the two latches being connected to each other by a transverse rigid link bar which is itself secured to an actuator handle and which constrains both latches to occupy identical angular positions.

8. A vehicle seat according to claim 7, in which the link bar is substantially rectilinear.

* * * * *